United States Patent
Asahina et al.

(10) Patent No.: US 6,876,743 B2
(45) Date of Patent: Apr. 5, 2005

(54) ONE-PIECE SPEAKER ASSEMBLY

(75) Inventors: Masato Asahina, Yamanashi-ken (JP); Isao Sone, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/145,719

(22) Filed: May 16, 2002

(65) Prior Publication Data

US 2002/0170772 A1 Nov. 21, 2002

(30) Foreign Application Priority Data

May 16, 2001 (JP) .......................... 2001-147098

(51) Int. Cl.$^7$ .................. H04R 9/00; H04R 23/00
(52) U.S. Cl. .................. 379/433.02; 379/433.01; 381/150; 381/386; 381/396; 181/199
(58) Field of Search .................. 181/153, 152, 181/199; 381/396, 189, 190, 151, 344, 431, 150, 386; 379/433.02, 433.01

(56) References Cited

U.S. PATENT DOCUMENTS

| | | | | |
|---|---|---|---|---|
| 5,764,784 A | * | 6/1998 | Sato et al. | 381/412 |
| 6,208,237 B1 | * | 3/2001 | Saiki et al. | 340/388.1 |
| 6,400,825 B1 | * | 6/2002 | Miyamoto et al. | 381/409 |
| 6,526,150 B2 | * | 2/2003 | Kelly et al. | 381/353 |
| 6,542,213 B1 | * | 4/2003 | Uchiyama | 349/149 |
| 6,553,119 B1 | * | 4/2003 | Mori | 379/433.11 |
| 6,553,125 B2 | * | 4/2003 | Kobayashi et al. | 381/396 |
| 6,613,267 B1 | * | 9/2003 | Konno | 264/437 |
| 6,628,043 B2 | * | 9/2003 | Furukawa et al. | 310/313 R |

* cited by examiner

Primary Examiner—David Martin
Assistant Examiner—Eduardo Colon-Santana
(74) Attorney, Agent, or Firm—Birch, Stewart, Kolasch & Birch, LLP

(57) ABSTRACT

A one-piece speaker assembly has a speaker having a case, a gasket made of elastomer and secured to an upper portion of the case, and a connector made of elastomer and secured to an underside of the case.

12 Claims, 4 Drawing Sheets

ONE-PIECE SPEAKER ASSEMBLY

BACKGROUND OF THE INVENTION

The present invention relates to a one-piece speaker assembly, and more particularly to a small speaker assembly used in a small electronic instrument such as a portable telephone.

In the resent years, parts for the small instrument are assembled on a substrate by the surface mounting technique, as the instrument is miniaturized. Furthermore, it is desirable to perform the surface mounting without soldering.

FIG. 4 is a sectional view showing a conventional dynamic speaker.

The speaker 50 comprises an annular case 51, a dish-like yoke 52 secured to the inside wall of the case 51, a permanent magnet 53 secured to the yoke 52, and a top plate 54 secured to the permanent magnet 53. A magnet circuit gap is formed between the top plate 54 and an upper portion of the yoke 52.

A diaphragm 55 is secured to a shoulder 51b of the case 51 at a peripheral portion 55b. An annular voice coil 56 is secured to the underside of the diaphragm 55 and disposed in the gap. An end portion 56a of the voice coil 56 is pulled out from an opening of the case 51 and connected to a terminal 58 on the underside of the case. A protector 57 is secured to the peripheral portion 55b of the diaphragm 55.

FIG. 5 is an illustration for explaining the surface mounting method for mounting the above described speaker on an electronic instrument.

The electronic instrument comprises an upper case 61, a lower case 62, a gasket 63 made of elastomer, speaker 50, a substrate 64 secured to the lower case 62, and a connector 65 which is preliminarily mounted on the substrate 64 to be connected to a circuit on the substrate.

Explaining mounting steps, the gasket 63 is secured to the upper case 61, the speaker 50 is secured to the gasket 63, and then the upper case 61 is mounted on the lower case 62. When the upper case 61 is mounted on the lower case 62, the connector 65 is contacted with the terminal 58 of the speaker 50.

In the conventional instrument, the gasket 63, speaker 50 and connector 65 are manufactured at different manufacturers, respectively. These parts are assembled by a final assembling factory. Consequently, there are troubles about storage management of parts and the number of assembling steps.

SUMMARY OF THE INVENTION

An object of the present invention is to provide a speaker which has a high reliability and is assembled by the small number of assembling steps.

According to the present invention, there is provided a one-piece speaker assembly comprising a speaker, a gasket having a hole for discharging sounds, and secured to an upper portion of the speaker, and a connector secured to an underside of the speaker.

The speaker has a cylindrical shape.

The connector is adhered to the underside of the speaker with a conductive layer so as to be connected to a terminal on the underside of the speaker.

The underside of the connector is processed into a conductive surface.

The conductive layer and the conductive surface on the both sides of the connector are electrically connected by conductive members provided in connector.

These and other objects and features of the present invention will become more apparent from the following detailed description with reference to the accompanying drawings.

DETAILED DESCRIPTION OF THE PREFERRED EMBODIMENT

Figure 1:
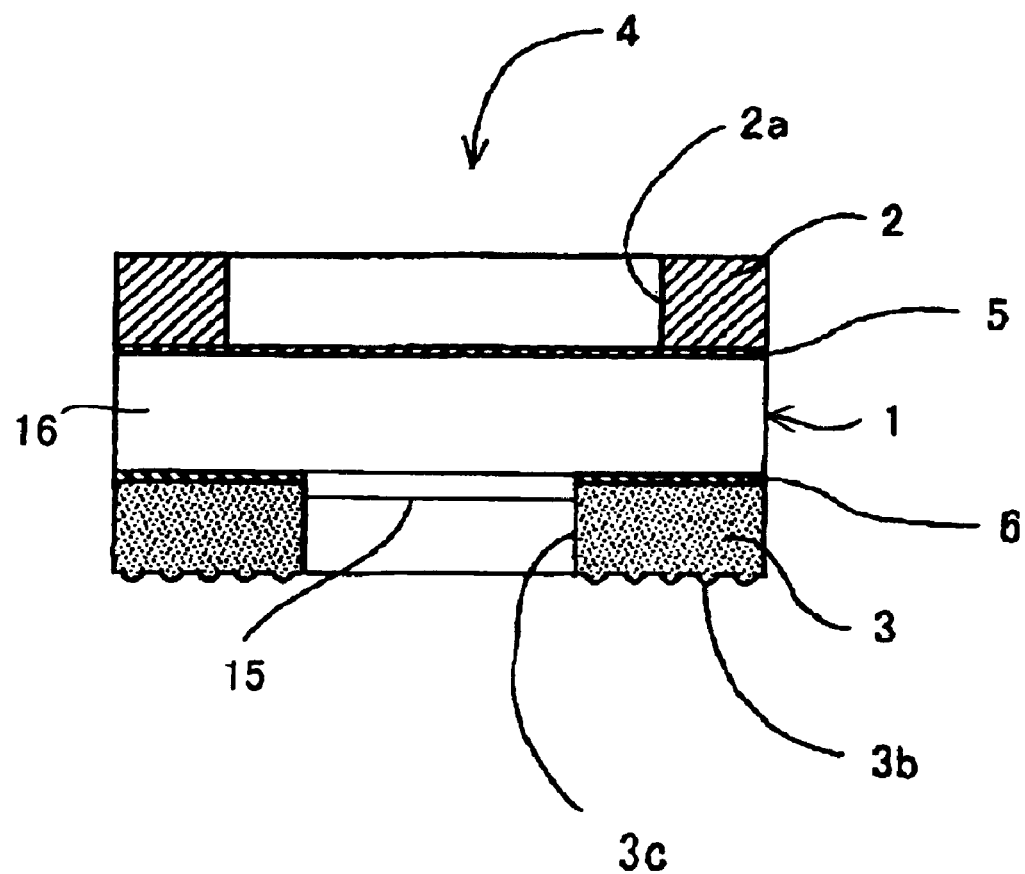
FIG. 1 is a sectional view of a speaker according to the present invention.
Figure 2:
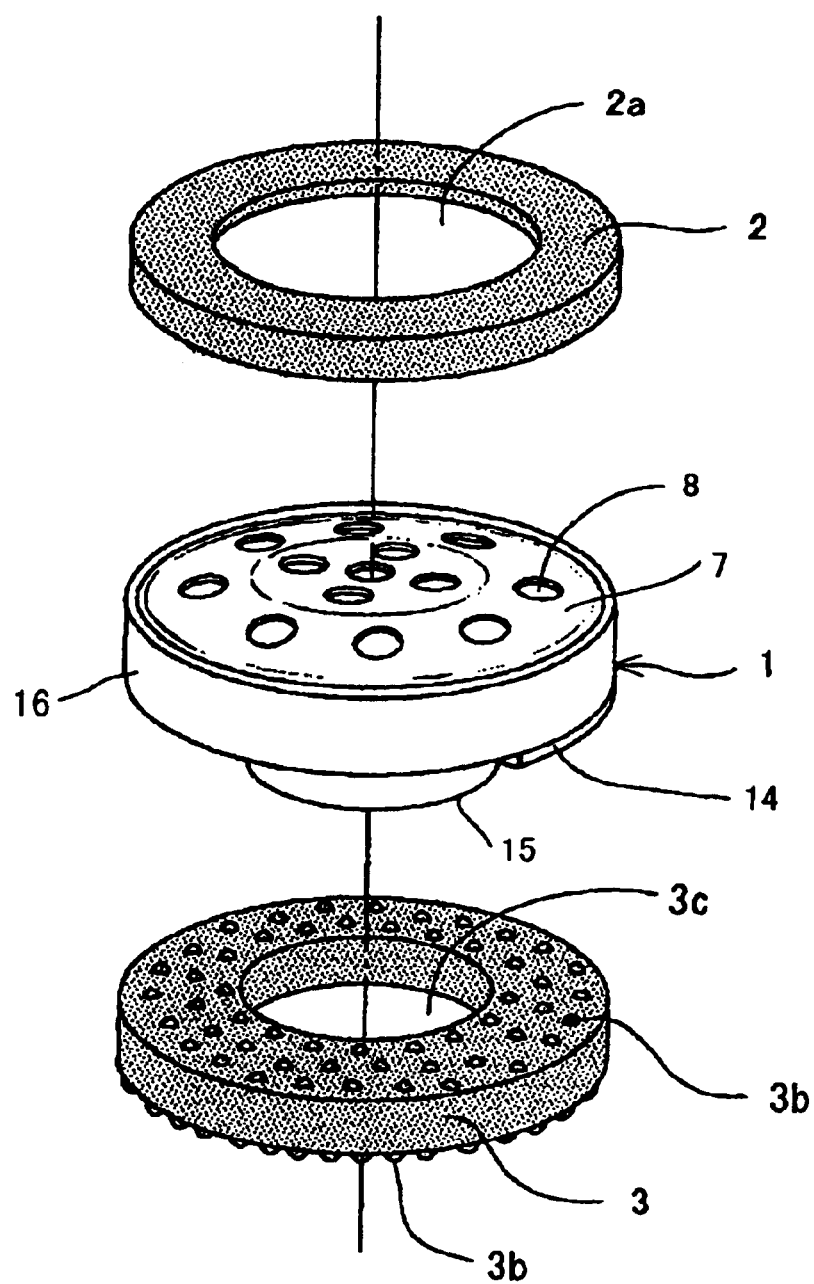
FIG. 2 is a perspective view of the speaker.

Referring to FIGS. 1 and 2, a speaker 1 has the same construction as the above described speaker 50. Accordingly, a detailed explanation will be omitted. The speaker 1 has a case 16 in which a speaker device is provided, and a protector 7 secured to an upper portion of the case 16. The protector 7 has a plurality of sound discharge holes 8. On the underside of the case 16, there is provided a terminal 14 and a yoke 15.

A gasket 2 made of polymeric material, for example elastomer such as silicon, polyurethane, and acrylic resin has a diameter equal to that of the speaker 1 and has a central hole 2a according to the sound discharge holes 8. The gasket 2 is adhered on the protector 7 of the speaker with an adhesive 5.

A connector 3 made of polymeric material such as elastomer has a central hole 3c for the yoke 15 of the speaker, and has a diameter equal to that of the speaker. The both sides of the connector 3 are coated with insulation layers, the surface of each of the layers is processed into a conductive surface as described in the Japanese Patent Application Laid Open 2002-25671. On the conductive surface, there is formed a plurality of bosses 3b. Connecting patterns (not shown) formed on the bosses 3b on both sides are connected with each other by wires passing through the connector, thereby forming an anisotropic conductive connector. Further, a conductive adhesive layer 6 is formed by printing anisotropic conductive films (ACF) formed on the conductive surfaces.

The connector 3 is adhered to the underside of the case 12. Thus, a one-piece speaker assembly 4 is provided.

Figure 3:
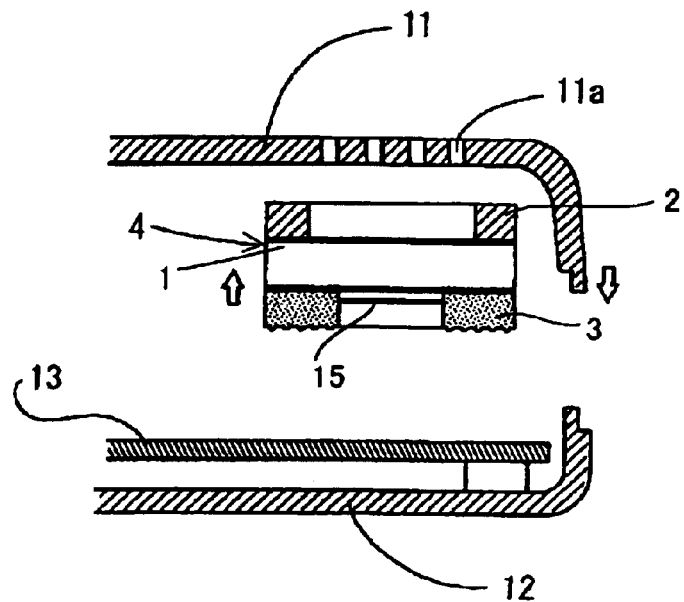
FIG. 3 is a sectional view showing a mounting method for the speaker.
Figure 4:
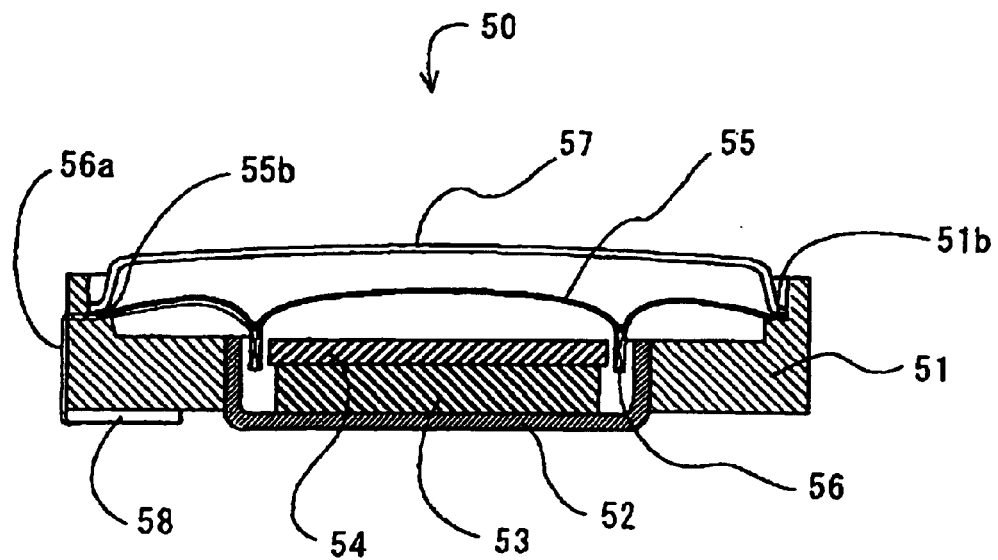
FIG. 4 is a sectional view showing a conventional dynamic speaker.
Figure 5:
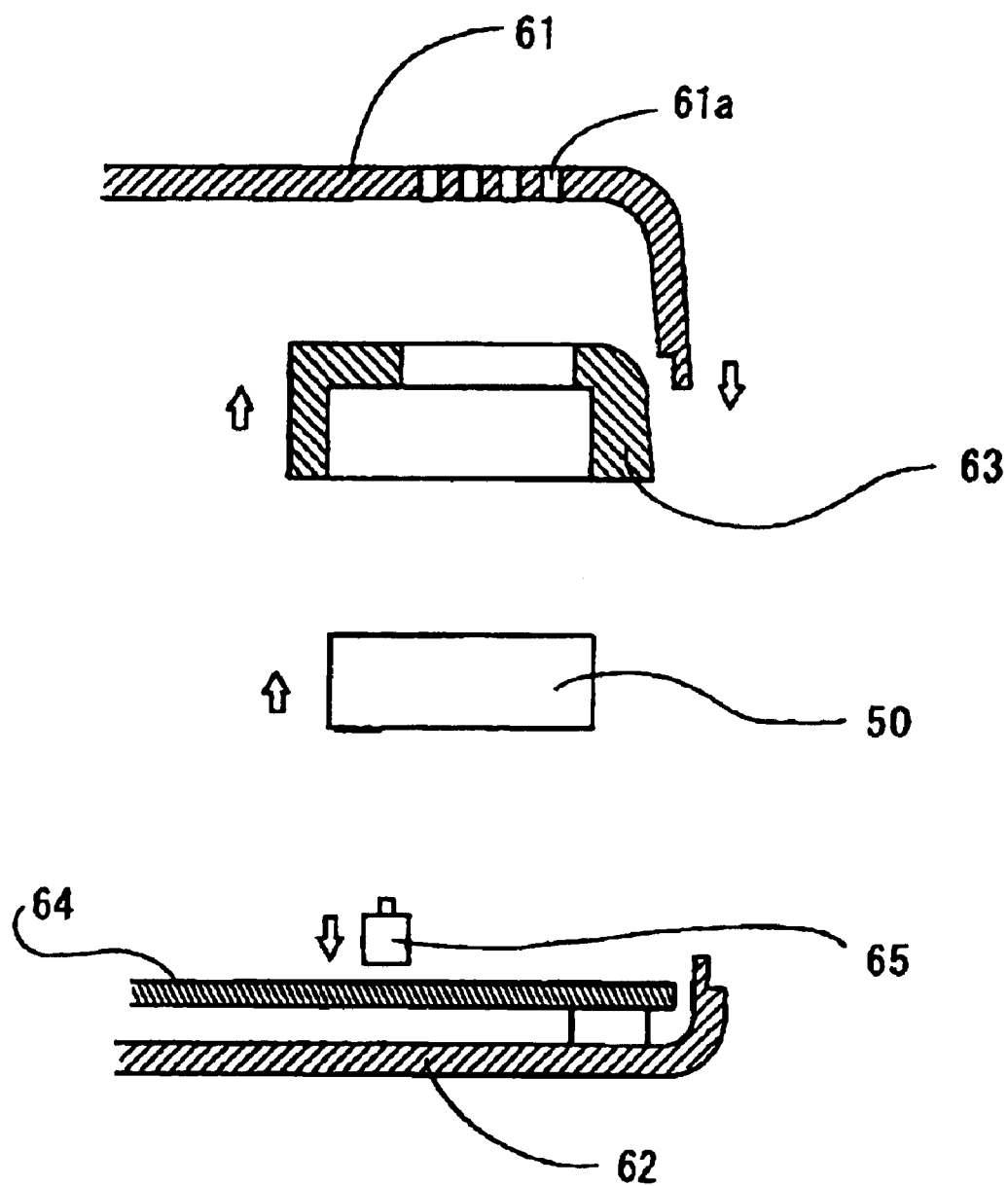
FIG. 5 is an exploded sectional view for explaining the assembling of a portable telephone.

Referring to FIG. 3, there is provided an upper case 11 for a portable telephone, a lowercase 12 on which a substrate 13 is securely mounted.

First, the gasket 2 of the one-piece speaker assembly 4 is adhered to the underside of the upper case 11, coinciding with sound discharge opening 11a. Then, the upper case 11 is secured to the lower case 12. Thus, the connector 3 is pressed against the patterns of the substrate 13 to be connected therewith, thereby completing the mounting.

In accordance with the present invention, the gasket and the connector are preliminarily secured to the speaker. Therefore, a speaker having three characteristics of omission of electric connecting operation, sound shielding effect and assembling tolerance absorption is obtained. The speaker has a high shock resistivity, so that the reliability of the speaker is improved.

While the invention has been described in conjunction with preferred specific embodiment thereof, it will be understood that this description is intended to illustrate and not limit the scope of the invention, which is defined by the following claims.

What is claimed is:

1. A one-piece speaker assembly comprising:
   a speaker;
   a gasket having a hole for discharging sounds, and fastened to an upper portion of the speaker;
   a connector fastened to an underside of the speaker; and
   each of an upper surface of the gasket and a lower surface of the connector having such a surface as to coincide with an inner wall of an electronic equipment in which the speaker assembly is to be mounted,
   wherein the gasket and the connector are made of polymeric material,
   the connector is adhered to the underside of the speaker with a conductive adhesive layer so as to be connected to the terminal on the underside of the speaker said conductive adhesive layer being formed by printing anisotropic conductive films (ACF) on the conductive surfaces.

2. The one-piece speaker assembly according to claim 1 wherein the speaker has a cylindrical shape.

3. The one-piece speaker assembly according to claim 2 wherein each of the gasket and the connector has an annular shape and has a diameter equal to the diameter of the speaker.

4. The one-piece speaker assembly according to claim 1 wherein the speaker has a terminal at the underside thereof.

5. The one-piece speaker assembly according to claim 1 wherein the underside of the connector is processed into a conductive surface.

6. The one-piece speaker assembly according to claim 5 wherein the conductive adhesive layer and the conductive surface on the both sides of the connector are electrically connected by conductive members provided in connector.

7. A one-piece speaker assembly comprising:
   a speaker;
   a gasket having a hole for discharging sounds, and secured to an upper portion of the speaker; and
   a connector fastened to an underside of the speaker;
   wherein the gasket and the connector are made of polymeric material, and
   the connector is adhered to the underside of the speaker with a conductive adhesive layer so as to be connected to the terminal on the underside of the speaker A1.

8. The one-piece speaker assembly according to claim 7, wherein the speaker has a cylindrical shape.

9. The one-piece speaker assembly according to claim 8, wherein each of the gasket and the connector has a diameter equal to the diameter of the speaker.

10. The one-piece speaker assembly according to claim 7, wherein the speaker has a terminal at the underside thereof.

11. A one-piece speaker assembly comprising:
    a speaker;
    a gasket having a hole for discharging sounds, and secured to an upper portion of the speaker; and
    a connector fastened to an underside of the speaker;
    wherein the gasket and the connector are made of polymeric material;
    the connector is adhered to the underside of the speaker with a conductive adhesive layer so as to be connected to the terminal on the underside of the speaker A1, and
    the underside of the connector is processed into a conductive surface.

12. A one-piece speaker assembly comprising:
    a speaker;
    a gasket having a hole for discharging sounds, and secured to an upper portion of the speaker; and
    a connector fastened to an underside of the speaker;
    wherein the gasket and the connector are made of polymeric material,
    the connector is adhered to the underside of the speaker with a conductive adhesive layer so as to be connected to the terminal on the underside of the speaker, said conductive adhesive layer being formed by printing anisotropic conductive films (ACF) on the conductive surface;
    the underside of the connector is processed into a conductive surface; and
    wherein the conductive adhesive layer and the conductive surface on both sides of the connector are electrically connected by conductive members provided in the connector.

* * * * *

UNITED STATES PATENT AND TRADEMARK OFFICE
CERTIFICATE OF CORRECTION

PATENT NO.     : 6,876,743 B2
DATED          : April 5, 2005
INVENTOR(S)    : Masato Asahina et al.

It is certified that error appears in the above-identified patent and that said Letters Patent is hereby corrected as shown below:

<u>Column 3, line 40 - Column 4, line 3,</u>
Claim 7 should read:
7. A one-piece speaker assembly comprising:

a speaker;

a gasket having a hole for discharging sounds, and secured to an upper portion of the speaker; and a connector fastened to an underside of the speaker;

wherein the gasket and the connector are made of polymeric material, and the connector is adhered to the underside of the speaker with a conductive adhesive layer so as to be connected to the terminal on the underside of the speaker said conductive adhesive layer being formed by printing anisotropic conductive films (ACF) on the conductive surfaces.

UNITED STATES PATENT AND TRADEMARK OFFICE
CERTIFICATE OF CORRECTION

PATENT NO. : 6,876,743 B2
DATED : April 5, 2005
INVENTOR(S) : Masato Asahina et al.

It is certified that error appears in the above-identified patent and that said Letters Patent is hereby corrected as shown below:

Column 4,
Lines 11-18,
    Claim 11 should read:
    11.    A one-piece speaker assembly comprising:

a speaker;

a gasket having a hole for discharging sounds, and secured to an upper portion of the speaker; and a connector fastened to an underside of the speaker;

wherein the gasket and the connector are made of polymeric material;

the connector is adhered to the underside of the speaker with a conductive adhesive layer so as to be connected to the terminal on the underside of the speaker, said conductive adhesive layer being formed by printing anisotropic conductive films (ACF) on the conductive surfaces and the underside of the connector is processed into a conductive surface.

Signed and Sealed this

Twenty-fifth Day of October, 2005

JON W. DUDAS
*Director of the United States Patent and Trademark Office*